(12) United States Patent
Holtzman

(10) Patent No.: US 7,082,933 B1
(45) Date of Patent: Aug. 1, 2006

(54) FUEL VALVE OPERATED BY NITROUS OXIDE PRESSURE

(76) Inventor: Barry Lyn Holtzman, 3907 Evergreen Rd., Eagle River, WI (US) 54521

( * ) Notice: Subject to any disclaimer, the term of this patent is extended or adjusted under 35 U.S.C. 154(b) by 0 days.

(21) Appl. No.: 11/131,695

(22) Filed: May 17, 2005

(51) Int. Cl.
F02B 23/00 (2006.01)

(52) U.S. Cl. ...................................... 123/585

(58) Field of Classification Search ................. 123/585
See application file for complete search history.

(56) References Cited

U.S. PATENT DOCUMENTS

| 2,562,742 | A | * | 7/1951 | Rowe et al. | 123/561 |
| 3,210,938 | A | * | 10/1965 | Mendez | 137/111 |
| 3,877,450 | A | * | 4/1975 | Meeks | 123/1 A |
| 4,571,172 | A | * | 2/1986 | Kendall-Tobias | 431/62 |
| 6,105,563 | A | * | 8/2000 | Patrick | 123/585 |

OTHER PUBLICATIONS

Joe Pettitt, "How to Install and use Nitrous Oxide", p. 6 1st par. cent col., p. 16 1st par. 3rd col., p. 17 fig3.1b,c, p. 18 3rd par 1st col.

Nitrous Express Inc. 2005 Catalog, pp. 2,3,7,8,9,11,13,14, 15,23,24,25,26,27,29,31,33,34,35,37,38,47 (items highlighted).

Nitrous Oxide Systems2005 Catalog, pp. 17,18,22 1st para., 23 1st para., 24 3rd para., 26 4th para., 51 (items highlighted).

* cited by examiner

Primary Examiner—Noah P. Kamen

(57) ABSTRACT

This invention is a fuel valve used with a nitrous oxide delivery system to control supplemental fuel flow to an engine. This valve is typically a normally closed valve which is opened by application of nitrous oxide under pressure when the nitrous oxide delivery system is activated. This application of nitrous oxide pressure applies an internal force to a piston means whereby the valve is opened and supplemental fuel flows to the engine. Upon de-activation of the nitrous oxide system and subsequent decrease of nitrous oxide pressure, the valve closes and supplemental fuel flow to the engine ceases. This valve is smaller and less costly than electrical solenoid valves presently in common use.

2 Claims, 1 Drawing Sheet

FUEL VALVE OPERATED BY NITROUS OXIDE PRESSURE

This invention is a fuel valve used with a nitrous oxide delivery system used for engine power enhancement, this valve controlling flow of supplemental fuel to the engine upon activation of the nitrous oxide system. This fuel valve typically is normally closed, and is opened by nitrous oxide pressure applied to the valve when the nitrous oxide delivery system is activated. This valve is lower in cost than the electrical solenoid valves commonly used, it reduces system installation time, and it requires less electrical power for system operation.

BACKGROUND

Description of Prior Art

Nitrous oxide, sometimes just called nitrous, is an oxidizing agent, and if delivered to an engine, can result in an increase in engine power output. Nitrous oxide systems have been developed for this application. In these systems, the nitrous oxide is commonly stored under pressure in a container, usually called a bottle, where it normally exists as a liquid in equilibrium with its vapor. Under these conditions, the bottle pressure changes with temperature; for instance, at 0 degrees Celsius, the bottle pressure is 31E06 dynes/cm^2 (450 pounds per square inch (PSI)); when at 25 degrees Celsius, the bottle pressure is 55E06 dynes/cm^2 (815 PSI). The bottles used in these systems contain a bottle valve which is connected through a suitable conduit to an electrically powered solenoid valve, commonly called a "nitrous valve". This nitrous valve is normally closed, and is opened by applying suitable electrical power controlled by a system activation switch. Nitrous pressure exists in the nitrous valve's inlet when the bottle valve is open, and when the nitrous valve is opened, its outlet is pressurized, pressurizing downstream conduits and jets with consequent nitrous flow to the engine.

When nitrous oxide is used as an engine oxidizer, the oxygen density in the engine's cylinder(s) increases requiring addition of supplemental fuel to maintain proper fuel/oxygen ratio. A method used to provide this supplemental fuel upon activation of the nitrous delivery system is to change the operating parameters of the engine's fuel injection system, causing the fuel injection system to deliver more fuel than normal. Another method is to pressurize carburetor float bowls to increase fuel flow. The most common method of adding supplemental fuel, however, is simply to open another electrically operated solenoid valve, a "fuel valve". This fuel valve has its inlet connected to a fuel source and its outlet is connected to suitable conduits and flow limiting jets. Upon opening this fuel valve a quantity of fuel is supplied to proper locations in the engine for fuel enrichment. This choice of an electrically operated solenoid valve is a natural one since the nitrous valve is normally also an electrically operated solenoid valve. Using a fuel valve is more common than changing fuel injection parameters or carburetor float bowl pressure because it is simpler to install and the nitrous supplemental fuel system "stands alone", providing a supplemental fuel system which does not affect the engine's primary fuel delivery system.

OBJECTS AND ADVANTAGES

It is an object of this invention to provide a fuel valve used with a nitrous oxide delivery system which uses nitrous oxide pressure to operate the valve.

Still further objects and advantages will become apparent from a consideration of the ensuing description and drawings.

DRAWING FIGURES

Figure 1:
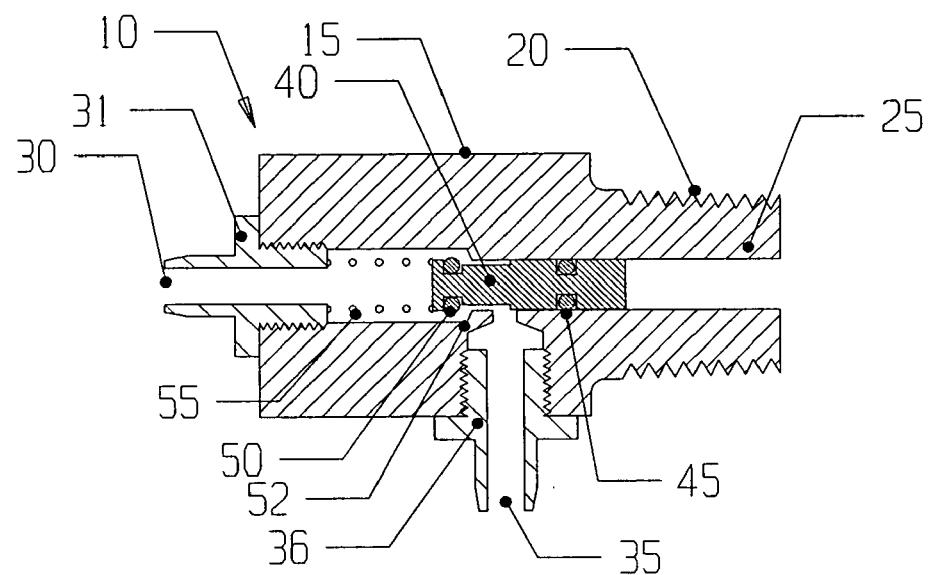
FIG. 1 shows in cross-section a fuel valve of this invention.

REFERENCE NUMERALS IN DRAWINGS 10 fuel valve assembly
15 valve body
20 attachment threads
25 valve nitrous oxide inlet
30 valve fuel inlet
31 valve fuel inlet fitting
35 valve fuel outlet
36 valve fuel outlet fitting
40 piston
45 piston nitrous oxide seal
50 fuel sealing member
52 fuel sealing seat
55 spring
100 nitrous oxide storage bottle
101 bottle valve
105 bottle valve outlet
110 nitrous oxide valve
115 nitrous oxide valve inlet
120 nitrous oxide valve outlet
125 tee
130 tee nitrous inlet
135 tee nitrous outlet

DESCRIPTION AND OPERATION—FIGS. 1 AND 2

FIG. 1 shows a fuel valve assembly 10 of this invention in an open position. Assembly 10 contains a body 15 with optional threads 20 for connecting the valve's nitrous oxide inlet 25 to a source of pressurized nitrous oxide (not shown). Valve 10 has a fuel inlet 30 contained in an optional fuel inlet fitting 31 and a fuel outlet 35 contained in an optional fuel outlet fitting 36. Contained inside valve assembly 10 is a piston 40 with a piston nitrous seal 45; seal 45 is preferably an o-ring. Piston 40 is shown in the open position with a fuel sealing member 50, preferably an o-ring, spaced a distance from a fuel sealing seat 52. A spring 55 applies a force to piston 40 which tends to move sealing member 50 toward sealing seat 52, and in the absence of nitrous oxide pressure in nitrous inlet 25, spring 55 forces sealing member 50 against seat 52 thereby closing valve 10. Valve 10 is therefore normally closed.

Figure 2:
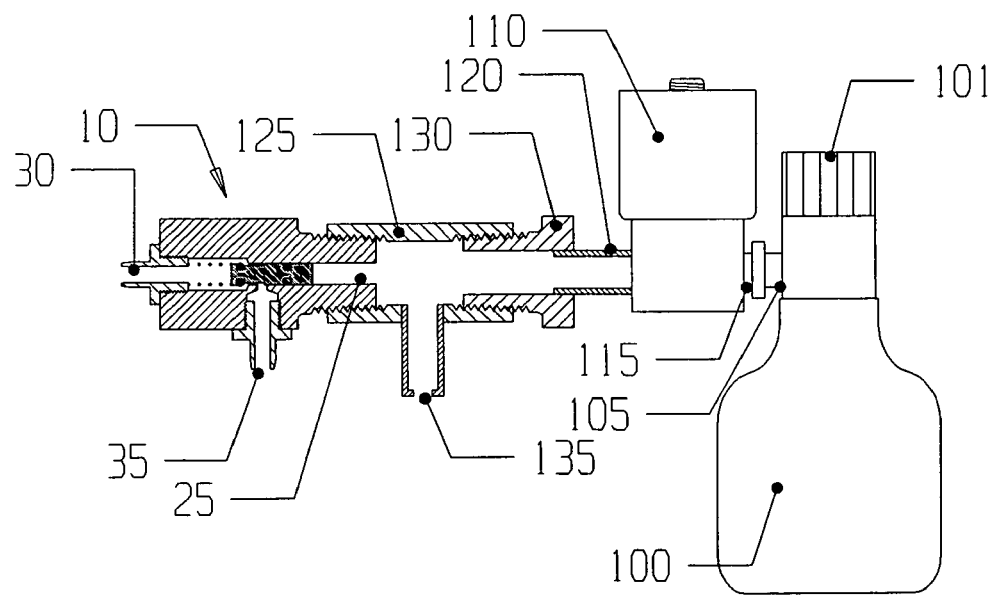
FIG. 2 shows a portion of a nitrous oxide delivery system in partial cross-section with the fuel valve of this invention.

FIG. 2 shows in partial cross-section a portion of a nitrous oxide system containing fuel valve assembly 10 along with some other system components. Shown is a storage bottle 100 used to store nitrous oxide under pressure. Bottle 100 has a valve 101 which is open normally only when filling bottle 100 or when it is anticipated that the nitrous oxide delivery system will be used. Bottle valve 100 has an outlet 105 which is connected by a suitable means to an inlet 115 of a nitrous oxide valve 110 which also has an outlet 120. Nitrous valve 110 typically is a normally closed electrical solenoid valve and is opened by a suitable activation means such as a battery, lead wires, and switch (not shown). Nitrous valve outlet 120 is connected by a suitable means to an inlet 130 of a tee 125, thereby pressurizing tee 125 with nitrous oxide when nitrous valve 110 is opened. Tee 125 contains an outlet 135 connected to a suitable means (not shown) for delivering nitrous oxide to an engine (not shown). Nitrous oxide inlet 25 of valve 10 is connected (preferably threaded) to tee 125. Fuel valve assembly 10 has its fuel inlet 30 connected to a suitable fuel source (not shown) through a suitable conduit (not shown) and has its outlet 35 connected to a suitable fuel delivery means (not shown) to deliver fuel to the engine.

Absent nitrous pressure in nitrous oxide inlet 25 of assembly 10, piston 40 is forced to a closed position (sealing member 50 compressed against sealing seat 52) by a pre-compression in spring 55. Upon opening of nitrous oxide system activation valve 110, nitrous oxide under pressure flows into tee 125 consequently pressurizing nitrous oxide inlet 25 of assembly 10. Pressurizing inlet 25 causes an opening force to be exerted on piston 40 and piston seal 45, and, at an opening design pressure, sealing member 50 will leave seat 52, opening valve 10 and allowing flow of supplemental fuel to the engine.

The opening design pressure of valve 10 is the nitrous oxide pressure at inlet 25 at which the opening force exerted by this pressure acting on piston 40 and piston seal 45 equals the closing force exerted by spring 55 on piston 40 at the point at which sealing member 50 breaks its seal with seat 52 plus any closing force exerted by fuel pressure in fuel inlet 30 on piston 40 and piston seal 45. There is normally also some frictional force which must be overcome in causing piston seal 45 to move, but this is normally relatively small. Therefore this opening design pressure is determined by the effective area of piston 40 and seal 45 (which in this case is the area of inlet 25), by the spring rate and pre-load of spring 55, the fuel pressure in fuel inlet 30, and any frictional force required to move piston seal 45. It has been found that a design pressure of approximately 6.9E06 dynes/cm^2 (100 PSI) is attainable with an inlet 25 diameter of 5.85 mm, a spring 55 with a rate of 1.3E08 dynes/cm and pre-load of 1E06 dynes, and fuel inlet 30 pressure of 6.9E05 dynes/cm^2 (10 PSI). Nitrous oxide vapor in equilibrium with its liquid has a pressure of 2.76E07 dynes/cm^2 (400 pounds/in^2 (PSI)) at −9° C. (20° F.). A design pressure of 6.9E06 dynes/cm^2 (100 PSI) is considerably lower than the nitrous oxide pressure available even at this low temperature, this design pressure ensuring that valve 10 will open and deliver fuel whenever the nitrous oxide delivery system is activated even at extremely low levels of nitrous oxide pressure/temperature.

After nitrous valve 110 is closed, nitrous pressure in the delivery system, and specifically in tee 125 and fuel valve inlet 25, decreases. At a sufficiently low pressure, the closing force exerted by spring 55 on piston 40 will overcome the opening force of the nitrous pressure (and the frictional force of piston seal 45) moving sealing member 50 toward seat 52, finally compressing sealing member 50 against seat 52 and closing fuel valve 10.

SUMMARY, RAMIFICATION, AND SCOPE

Accordingly, the reader will see that this invention is a fuel valve which is operated by nitrous oxide pressure, this valve being used to control supplemental fuel flow. This valve eliminates the electrical solenoid fuel valve normally used, and has the advantages of being lower in cost, smaller, and in many cases easier to install. It also reduces electrical system power requirements, this in many cases being important in applications on smaller recreational vehicles which do not have a battery for engine starting.

Although the description above contains many specificities, these should not be construed as limiting the scope of the invention but as merely providing illustrations of some of the presently preferred embodiments of this invention. For instance spring 55 is shown located in the fuel section of valve 10, but can also be located on the other side of piston 45 with suitable changes in design and still perform the same function. Also, the member used to cause opening of the valve is shown as piston 40, but other means of transferring a force from the pressurized nitrous oxide to open the valve, such as a diaphragm, exist. Also spring 55 is shown as a coil spring, but other types of springs which can be used are disc springs or even o-rings. This valve could also be used with an engine oxidizing system in which other oxidizing agents are used, such as pure oxygen. Thus, the scope of the invention should be determined by the appended claims and their legal equivalents, rather than by the examples given.

I claim:

1. In a nitrous oxide system which delivers said nitrous oxide to an engine and wherein said nitrous oxide system contains control means which in its intended operation always has flow of said nitrous oxide when an inlet of said control means is pressurized with said nitrous oxide and said control means is in an open position, and wherein delivery of supplemental fuel to said engine is required due to delivery of said nitrous oxide to said engine by said nitrous oxide system, a fuel valve to control flow of said supplemental fuel which is opened by pressure of said nitrous oxide downstream of said control means and wherein said fuel valve when opened at any operating pressure level of said nitrous oxide in said nitrous oxide system is ineffective in limiting said flow of said supplemental fuel.

2. In an oxidizer system which delivers said oxidizer to an engine and wherein said oxidizer system contains control means which in its intended operation always has flow of said oxidizer when an inlet of said control means is pressurized with said oxidizer and said control means is in an open position, and wherein delivery of supplemental fuel to said engine is required due to delivery of said oxidizer to said engine by said oxidizer system, a fuel valve to control flow of said supplemental fuel which is opened by pressure of said oxidizer downstream of said control means and wherein said fuel valve when opened at any operating pressure level of said oxidizer in said oxidizer system is ineffective in limiting said flow of said supplemental fuel.

* * * * *